United States Patent
Benedetti

(10) Patent No.: US 8,714,898 B2
(45) Date of Patent: May 6, 2014

(54) SHIELDING AND INSULATION FASTENER

(71) Applicant: Newfrey LLC, Newark, DE (US)

(72) Inventor: Steven M. Benedetti, Sterling Heights, MI (US)

(73) Assignee: Newfrey LLC, Newark, DE (US)

(*) Notice: Subject to any disclaimer, the term of this patent is extended or adjusted under 35 U.S.C. 154(b) by 0 days.

(21) Appl. No.: 13/735,153

(22) Filed: Jan. 7, 2013

(65) Prior Publication Data

US 2013/0177367 A1 Jul. 11, 2013

Related U.S. Application Data

(60) Provisional application No. 61/584,511, filed on Jan. 9, 2012.

(51) Int. Cl.
*F16B 21/18* (2006.01)

(52) U.S. Cl.
USPC ............ 411/522; 411/523; 411/524

(58) Field of Classification Search
USPC ......... 411/192, 337, 511, 515, 522, 523, 524, 411/547; 24/293
See application file for complete search history.

(56) References Cited

U.S. PATENT DOCUMENTS

| | | | | |
|---|---|---|---|---|
| 2,239,797 A * | 4/1941 | Tinnerman | | 411/524 |
| 2,286,042 A * | 6/1942 | Tinnerman | | 411/523 |
| 2,345,053 A * | 3/1944 | Judd et al. | | 411/523 |
| 2,350,315 A * | 5/1944 | Kral | | 411/523 |
| 2,644,213 A | 7/1953 | Bedford | | |
| 3,362,278 A * | 1/1968 | Munse | | 411/437 |
| 4,826,375 A * | 5/1989 | Holton | | 411/174 |
| 6,401,311 B1 | 6/2002 | Eckenrode | | |
| 7,111,881 B2 | 9/2006 | Paskonis | | |
| 7,645,107 B2 * | 1/2010 | Yoneoka | | 411/437 |
| 7,766,286 B2 | 8/2010 | Koczmarek et al. | | |
| 2009/0087282 A1 * | 4/2009 | van Walraven | | 411/520 |
| 2010/0270006 A1 | 10/2010 | Kaczmarek et al. | | |

FOREIGN PATENT DOCUMENTS

| | | |
|---|---|---|
| DE | 24 36719 A1 | 2/1975 |
| DE | 92 10 099 | 9/1992 |
| DE | 197 48 962 C1 | 6/1999 |
| EP | 1 182 369 A1 | 2/2002 |
| EP | 1 752 668 A1 | 2/2007 |
| EP | 1 978 288 A1 | 10/2008 |

OTHER PUBLICATIONS

Ford Product Engineering, Clip M6—1 Push On, Jan. 20, 1995, 1 page.
Palnut Removable Type Pushnut PZ Type Fasteners, 1 page.
A Raymond, Robust and quick methods for fastening parts at the underbody, 3. An example of Heat Shield Fixing, 1 page.
European Search Report for EP 13 15 0553, mailed Apr. 10, 2013 (6 pages).

* cited by examiner

*Primary Examiner* — Roberta Delisle
(74) *Attorney, Agent, or Firm* — Harness, Dickey & Pierce, P.L.C.

(57) ABSTRACT

A manually installed fastener includes a fastener body having parallel first and second plates, the second plate having an aperture. A bend member integrally joins the first and second plates. The bend member has an outer deflectable leg integrally connected to the first plate and an inner deflectable leg integrally connected to the second plate. A first barb is integrally connected to the first plate and extends through the aperture of the second plate. A second barb is integrally connected to the second plate and is oppositely oriented with respect to the first barb. The second barb and the second plate are elastically displaced with respect to the first barb and the first plate to change a clearance diameter between the first and second barbs.

29 Claims, 4 Drawing Sheets

SHIELDING AND INSULATION FASTENER

CROSS-REFERENCE TO RELATED APPLICATIONS

This application claims the benefit of U.S. Provisional Application No. 61/584,511, filed on Jan. 9, 2012. The entire disclosure of the above application is incorporated herein by reference.

FIELD

The present disclosure relates to manually installed push-nut fasteners for retention of shielding and/or insulation.

BACKGROUND

This section provides background information related to the present disclosure which is not necessarily prior art.

Removable push-nut fasteners are known which allow for manual installation by pushing the fastener onto a stud and require no further operation to connect the fastener to the stud. These designs may include opposed deflectable barbs which elastically deflect and create a biasing force acting against the stud to retain the fastener in position. Disadvantages of known push-nut fasteners include the inability to simultaneously oppositely displace both barbs to allow for removal of the fastener, which leads to damage of the stud and/or fastener, and the provision of the barbs on the same fastener plate or member, thereby not permitting any adjustment of the spacing between the barbs to accommodate differences in stud diameter.

SUMMARY

This section provides a general summary of the disclosure, and is not a comprehensive disclosure of its full scope or all of its features.

According to several aspects of the disclosure, a manually installed fastener includes a fastener body having parallel first and second plates, the second plate having an aperture. A bend member integrally joins the first and second plates. The bend member has an outer deflectable leg integrally connected to the first plate and an inner deflectable leg integrally connected to the second plate. A first barb is integrally connected to the first plate and extends through the aperture of the second plate. A second barb is integrally connected to the second plate and is oppositely oriented with respect to the first barb. The second barb and the second plate are elastically displaced with respect to the first barb and the first plate to change a clearance diameter between the first and second barbs.

According to further aspects, a fixed leg is integrally connected to the first plate and oppositely positioned on the first plate with respect to the bend member. A force applied to the bend member and oppositely applied to the fixed leg deflects at least one of the outer or inner deflectable legs causing the second plate and the second barb to displace with respect to the first plate and the first barb, thereby changing a clearance diameter between the first and second barbs.

According to still further aspects, a raised bead can be provided with both the first and second plates, the raised bead of the first plate nesting in the raised bead of the second plate to prevent rotation of the first plate with respect to the second plate.

According to still further aspects, one or more bite members are provided with the first plate extending away from the first plate and oppositely directed with respect to the first and second barbs. The bite members engage an object contacted by the fastener to prevent rotation of the fastener with respect to the object.

According to still further aspects, the first and second barbs are curve-shaped, thereby resisting deflection of the first and second barbs, while simultaneously having concave curved barb ends of the first and second barbs providing for curvilinear contact with a stud.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
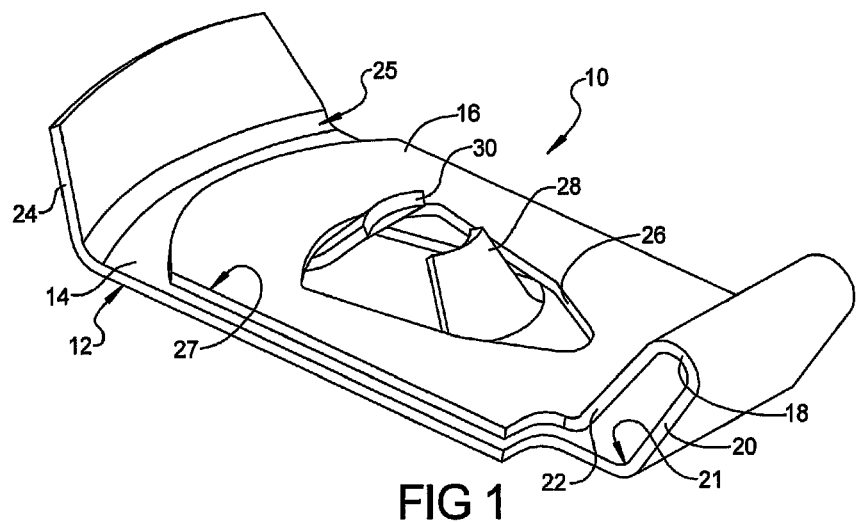
FIG. 1 is a front perspective view of a shielding and insulation fastener of the present disclosure.

Referring to FIG. 1, a fastener 10 includes a fastener body 12 which is made from a metal such as a spring steel and includes a first plate 14 and a substantially parallel second plate 16. Fastener body 12 is created by bending material of fastener body 12 at a bend member 18 such that second plate 16 is brought into parallel alignment with first plate 14. Upon bending the material at bend member 18, an outer deflectable leg 20 is created having a first curved portion 21 created between outer deflectable leg 20 and first plate 14. An inner deflectable leg 22 is also created when bend member 18 is formed. Inner deflectable leg 22 is integrally connected to second plate 16.

A fixed leg 24 is positioned at an opposite end of fastener body 12 with respect to bend member 18. Fixed leg 24 is integrally connected to first plate 14 by a second curved portion 25. According to several embodiments, the fixed leg 24 and the bend member 18 both extend away from first plate 14 in an upward direction, as viewed in FIG. 1. An aperture 26 is created in second plate 16 such that both a first barb 28 and a second barb 30 extend upwardly with respect to an upper surface 27 of second plate 16. The first barb 28 is integrally connected to first plate 14 and extends through aperture 26. The second barb 30 is integrally connected to second plate 16.

Figure 2:
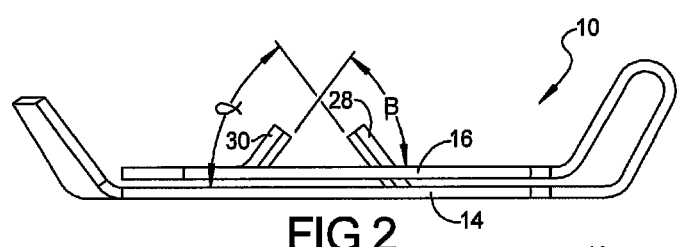
FIG. 2 is a front elevational view of the fastener of FIG. 1.

Referring to FIG. 2 and again to FIG. 1, the first barb 28 is oriented at a first barb orientation angle α with respect to first plate 14. According to several embodiments, first barb orientation angle α is less than 90 degrees and preferably ranges between approximately 20 degrees to 60 degrees. The second barb 30 is oriented at a second barb orientation angle β which according to several embodiments is substantially equal to first barb orientation angle α. Angle β is directed oppositely with respect to angle α such that first and second barbs 28, 30 are angled/directed toward each other at the apex of the barbs.

Referring to FIG. 3 and again to FIG. 1, first barb 28 includes a curved barb end 32 and second barb 30 includes a curved barb end 34. Curved barb ends 32, 34 together define a clearance diameter "A". The clearance diameter "A" corresponds to a shank diameter of a stud, shown and described with reference to FIG. 5, which is received between the first and second barbs 28, 30 when fastener 10 is installed.

To provide for the formation of bend member 18, the first curved portion 21, which transitions between first plate 14 and outer deflectable leg 20, is oriented substantially transverse with respect to a longitudinal axis 31 of fastener 10. According to several embodiments, fixed leg 24 is substantially rigid to resist bending during installation or removal of fastener 10. To provide the rigidity of fixed leg 24, the second curved portion 25 defines a compound curve which both transitions between first plate 14 and fixed leg 24. Unlike first curved portion 21 which is oriented substantially transverse to longitudinal axis 31, second curved portion 25 defines a curve bisected with respect to longitudinal axis 31. The duplex or compound curve defined by second curved portion 25 provides additional resistance to bending of fixed leg 24 after its initial formation and during use of fastener 10.

Figure 3:
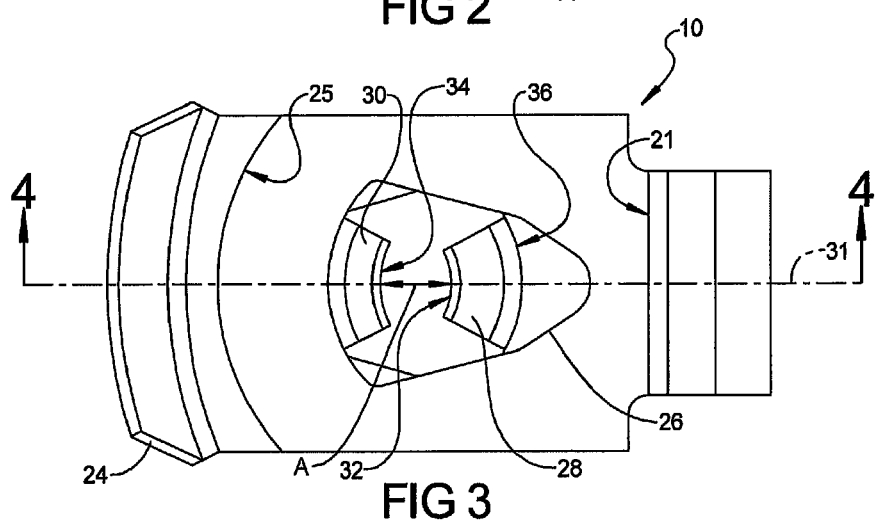
FIG. 3 is a top plan view of the fastener of FIG. 1.
Figure 4:
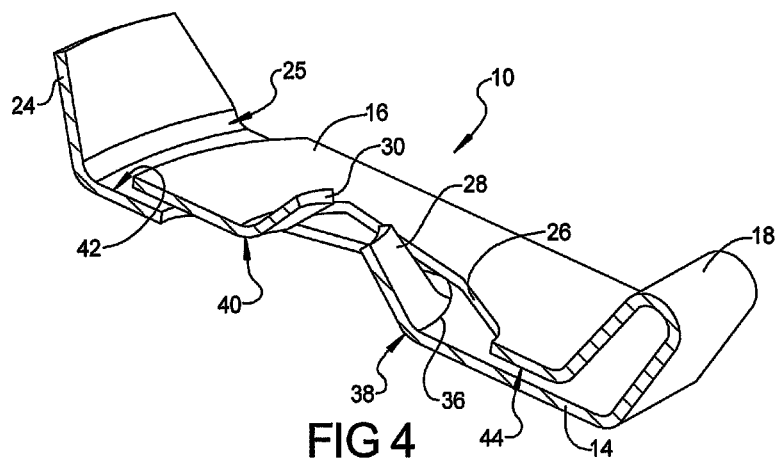
FIG. 4 is a front perspective cross sectional view taken at section 4 of FIG. 3.

Referring to FIG. 4 and again to FIGS. 1 and 3, each of the first and second barbs 28, 30 are curved or arc-shaped in cross-section to also add rigidity to first and second barbs 28, 30. First barb 28 is integrally connected to first plate 14 via a first barb base 36 which defines a barb bend portion 38. Second barb 30 similarly includes a barb bend portion 40 where second barb 30 is integrally connected to second plate 16. As best seen in FIG. 4, the aperture 26 created in second plate 16 is sized large enough to accommodate the first barb base 36 of first barb 28 when second plate 16 is positioned substantially parallel to and/or in direct contact with first plate 14.

According to several embodiments, second plate 16 after formation of bend member 18 is oriented substantially parallel with and can be in direct contact with first plate 14. According to other embodiments, a clearance can be provided between a first plate upper surface 42 of first plate 14 and a second plate lower surface 44 of second plate 16 with no direct contact provided between first plate upper surface 42 and second plate lower surface 44 when fastener body 12 is in its complete assembled condition. The size of aperture 26 is also predetermined to allow the second plate 16 to be subsequently slid toward fixed leg 24 as will be better described in reference to FIG. 5.

Figure 5:
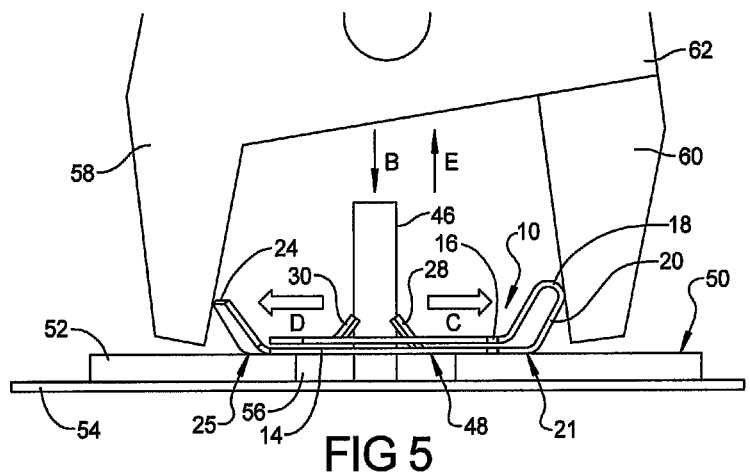
FIG. 5 is a front elevational view of the fastener of FIG. 1 shown in an installed condition.

Referring to FIG. 5, fastener 10 is shown after completing installation with respect to a stud 46. Fastener 10 is installed by manually pressing in a fastener installation direction "B" such that a first plate lower surface 48 of first plate 14 directly contacts an outer surface 50 of an object 52. Object 52 can be any of multiple items such as a vehicle body panel, a layer of insulation, or a similar item which is desired to be retained with respect to a panel 54 such as a body panel of a vehicle. The stud 46 is fixedly connected to panel 54 for example by stud welding, threading, or similar fixing process. A clearance opening 56 is provided through object 52 to allow the free extension of stud 46 beyond object 52 for subsequent receipt of fastener 10. As previously noted, fastener 10 is inserted in the fastener installation direction "B" until the object 52 is directly in contact with panel 54, during which time the first barb 28 elastically deflects in a first direction "C" and the second barb 30 elastically deflects in a second direction "D" which is oppositely directed with respect to first direction "C". This elastic deflection of first and second barbs 28, 30 creates a biasing force which thereafter binds or frictionally engages first and second barbs 28, 30 to stud 46, thereby resisting release of fastener 10 in a fastener removal direction "E". According to further embodiments, first and second barbs 28, 30 are substantially rigid, therefore to accommodate stud 46, the second plate 16 slidably and elastically displaces in the second direction "D" during installation of fastener 10 in the fastener installation direction "B". The biasing force to retain fastener 10 is created by elastic deflection of the material at bend member 18 as second plate 16 displaces. This biasing force acts in the first direction "C".

When it is desired to remove fastener 10, first and second force application members 58, 60 of a tool 62, such as a pliers, are brought directly into contact with each of the fixed leg 24 and the outer deflectable leg 20 of fastener body 12. In the example shown, the first force application member 58 is brought directly into contact with fixed leg 24 and the second force application member 60 is brought directly into contact with outer deflectable leg 20. Subsequent operation of tool 62 acts to displace either or both of the first and second force application members 58, 60. The fixed leg 24 resists further deflection; however, the outer deflectable leg 20 deflects in the second direction "D" with respect to first curved portion 21. Because second barb 30 is integrally connected to second plate 16, as second plate 16 displaces in the second direction "D", the second barb 30 displaces away from stud 46 also in the second direction "D". Similarly, during the displacement of second plate 16, the first barb 28 moves in the first direction "C" and also therefore away from stud 46, thereby providing clearance between first and second barbs 28, 30 and stud 46 to allow subsequent removal of fastener 10 in the fastener removal direction "E". As previously noted, the second curved portion 25 resists bending, thereby substantially preventing fixed leg 24 from deflecting in the first direction "C" during the fastener removal process. The geometry of first curved portion 21 permits the elastic deflection of bend member 18 during the removal process. After removal, fastener 10 can also be reused in the same or a new location with respect to stud 46 or a different stud. Removal of fastener 10 therefore provides for subsequent removal of object 52 with respect to panel 54.

Figure 6:
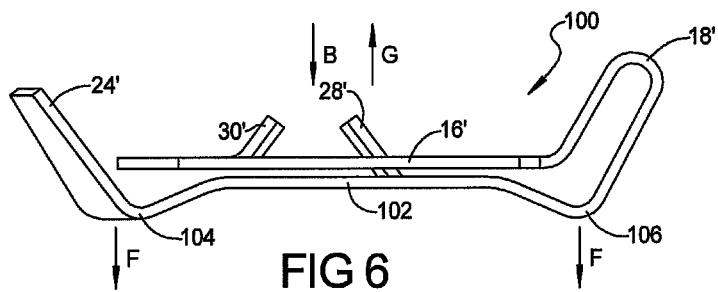
FIG. 6 is a front elevational view of another embodiment of a fastener of the present disclosure.

Referring to FIG. 6, a fastener 100 is modified from fastener 10, therefore only the differences between fastener 100 and fastener 10 will hereinafter be described. Fastener 100 includes a fastener body 102 having opposite ends which are permanently deflected transversely with respect to second plate 16'. A first downward bend 104 is created by displacing material of fastener body 102 in a downward direction "F", as viewed in FIG. 6. Similarly, a second downward bend 106 is formed proximate to bend member 18' by permanently deflecting material of fastener body 102 also in the downward direction "F".

The addition of first and second downward bends 104, 106 provides several advantages. The spacing between first and second downward bends 104, 106 allows the first and second downward bends 104, 106 to displace into the object 52, shown and described in reference to FIG. 5, when object 52 is a flexible or deflectable material such as an insulation material. This provides for frictional engagement of fastener 100 with respect to object 52, thereby resisting a twisting or axial rotation of fastener 100 with respect to stud 46. In addition, first and second downward bends 104, 106, by their spacing with respect to fastener body 102, permit the central section of fastener body 102 to also elastically deflect in the fastener installation direction "B" during installation of fastener 100. This provides an additional elastic biasing force tending to pull first and second barbs 28', 30' toward each other, thereby increasing a resistance to release of fastener 100. This additional biasing force created in fastener body 102 acts in a biasing force direction "G" which is oppositely directed with respect to fastener installation direction "B".

Referring to FIG. 7 and again to FIGS. 1-6, a fastener 200 is modified with respect to both fastener 100 and fastener 10, therefore only the differences between fastener 200 and each of fastener 100 and fastener 10 will be further described herein. Fastener 200 includes a first raised bead 202 which is oriented substantially parallel with respect to longitudinal axis 31'. First raised bead 202 is positioned proximate to a first body edge 204 of second plate 16'. A second raised bead 206 is positioned proximate to a second body edge 208 and is also oriented substantially parallel with respect to longitudinal axis 31'.

Figure 7:
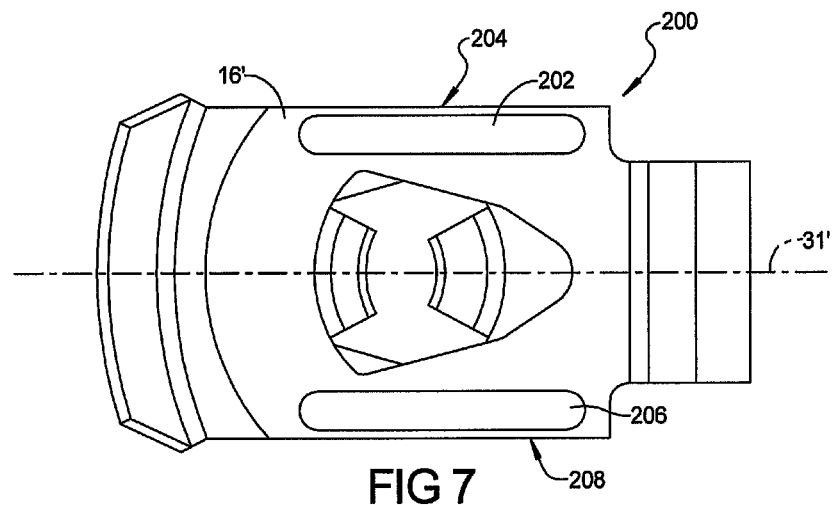
FIG. 7 is a top plan view of another embodiment for a fastener of the present disclosure.
Figure 8:
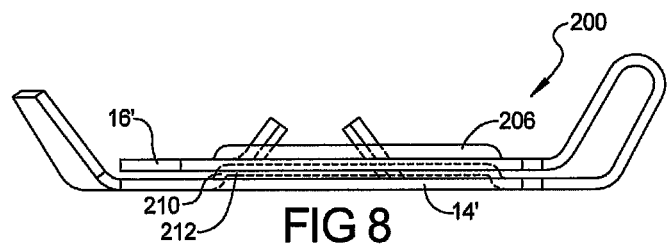
FIG. 8 is a front elevational view of the fastener of FIG. 7.

Referring to FIG. 8 and again to FIG. 7, first plate 14' of fastener 200 also includes a third raised bead 210 which is positioned directly below first raised bead 202 and a fourth raised bead 212 which is positioned directly below second raised bead 206. The third raised bead 210 is configured to be at least partially received within first raised bead 202, and similarly, the fourth raised bead 212 is configured to be at least partially received within the second raised bead 206 when second plate 16' is positioned as shown with respect to first plate 14'. The purpose of the raised beads of fastener 200 is therefore to prevent rotational displacement of the second plate 16' with respect to the first plate 14' when fastener 200 is in its finished or assembled condition shown, and also when fastener 200 is in an installed condition. The raised beads of fastener 200 therefore engage each other to prevent rotation while still permitting sliding axial displacement of second plate 16' with respect to first plate 14' in a direction parallel to longitudinal axis 31'.

Referring to FIG. 9 and again to FIGS. 1-8, a fastener 300 is modified from the previously described fasteners 200, 100, 10; therefore, only the differences will be further described herein. Fastener 300 includes oppositely arranged first and second tab clamps 302, 304 which can be used in lieu of the raised beads previously described with respect to fastener 200 to prevent rotation of second plate 16" with respect to first plate 14". First tab clamp 302 is positioned proximate to a first body edge 204' and second tab clamp 304 is positioned proximate to a second body edge 208' of fastener 300.

Figure 9:
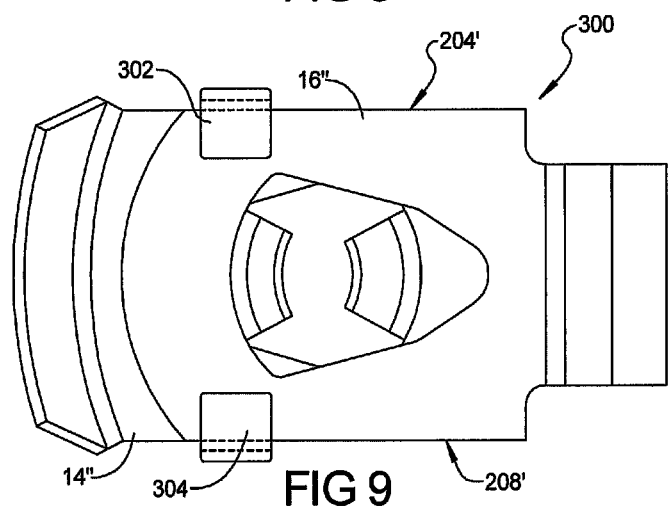
FIG. 9 is a top plan view of a further embodiment for a fastener of the present disclosure.
Figure 10:
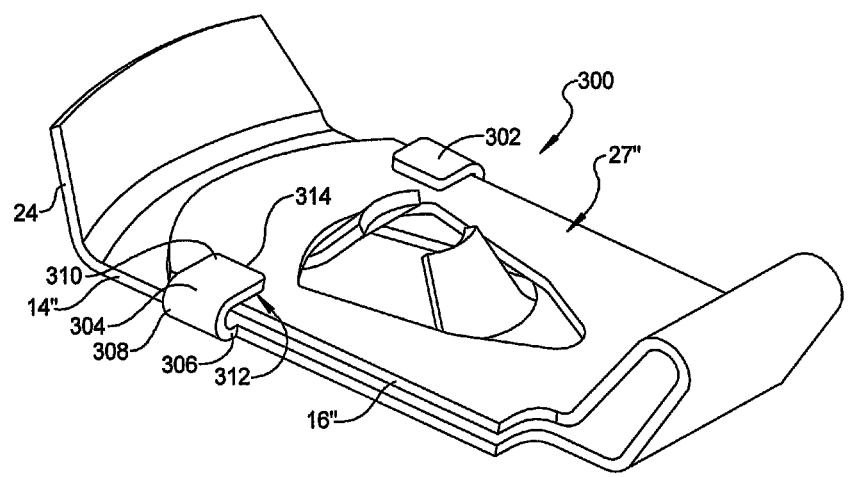
FIG. 10 is a front perspective view of the fastener of FIG. 9.

Referring to FIG. 10 and again to FIG. 9, the first and second tab clamps 302, 304 define mirror images of each other, therefore the following discussion of second tab clamp 304 applies equally to first tab clamp 302. Second tab clamp 304 includes a connecting portion 306 which is integrally connected to an edge of first plate 14". Connecting portion 306 transitions into a bend portion 308 which further transitions into a retention portion 310 having a contact face 312 which is positioned parallel to and/or in direct contact with respect to upper surface 27" of second plate 16". A free end 314 of retention portion 310 can be rounded as shown, thereby eliminating sharp corners of retention portion 310.

The advantages of using both first and second tab clamps 302, 304 are that the first and second tab clamps 302, 304 provide both resistance to torsional or twisting motion between the first and second plates 14", 16" as well as resistance to displacement of second plate 16" away from first plate 14". The connecting portions 306 can be fixed to first plate 14" or can define integral extensions of the body material of first plate 14". First and second tab clamps 302, 304 also permit sliding motion of second plate 16" with respect to first plate 14" during fastener installation, as previously described herein.

Figure 11:
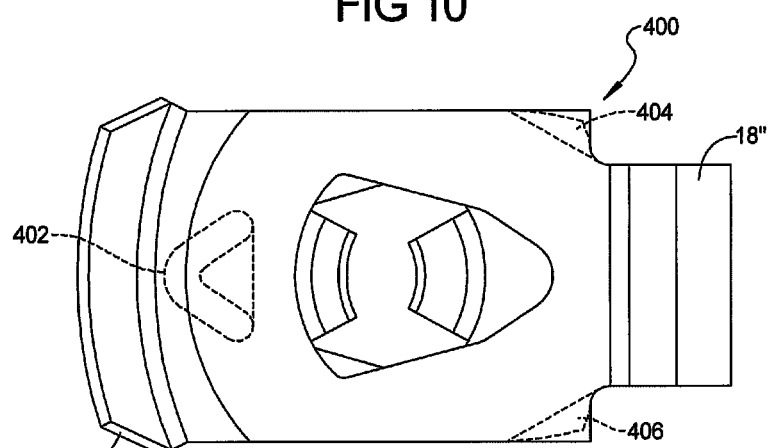
FIG. 11 is a top plan view of a further embodiment for a fastener of the present disclosure.
Figure 12:
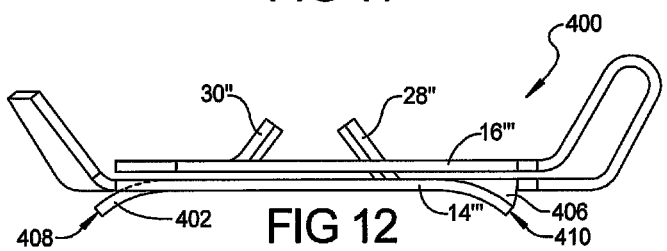
FIG. 12 is a front elevational view of the fastener of FIG. 11.

Referring to FIG. 11, a fastener 400 is modified with respect to the previously described fasteners 300, 200, 100, and 10 as previously described in reference to FIGS. 1-10. Fastener 400 provides bite type members to resist rotation of fastener 400 when fastener 400 is received in its installed position with respect to object 52. First plate 14''' of fastener 400 includes each of a V-shaped bite member 402, positioned proximate to fixed leg 24", and each of a first and second corner bite member 404, 406 positioned proximate to bend member 18". V-shaped bite member 402 can be created by a piercing operation to deflect a portion of the material of first plate 14''' downwardly or away from the viewer as viewed in FIG. 11. Each of the first and second corner bite members 404, 406 can be created by bending corners of first plate 14''' as will be better shown and described in reference to FIG. 12.

Referring to FIG. 12 and again to FIGS. 5 and 11, the V-shaped bite member 402 is deformed to face oppositely with respect to first and second barbs 28", 30". A first bite edge 408 is thereby created at a free end of V-shaped bite member 402. Each of the first and second corner bite members 404, 406 (only second corner bite member 406 is clearly visible in this view) are also deflected downwardly and oppositely with respect to first and second barbs 28", 30". Each of the first and second corner bite members 404, 406 provides a second bite edge 410. The first and second bite edges 408, 410 allow for at least partial penetration of the V-shaped bite member 402 and each of the first and second corner bite members 404, 406 into the material of object 52, thereby preventing rotation of fastener 400 when fastener 400 is in its installed position.

Fasteners of the present disclosure provide several advantages. These include the capability of displacing both oppositely positioned first and second barbs 28, 30 away from each other by deflecting the outer deflectable leg 20 and the second plate 16 toward the fixed leg 24 in a single operation. The fasteners of the present disclosure also provide the first and second barbs 28, 30 individually integrally connected to only two parallel arranged plates, defined by first and second plates 14, 16. This reduces the cost of fasteners of the present disclosure because only a single bend member 18 is required to position the second plate 16 parallel with and in close proximity to first plate 14. By creating a second curved portion 25 where fixed leg 24 is integrally connected to first plate 14, the fixed leg 24 resists subsequent bending or deflection while permitting the sliding motion of second plate 16 with respect to first plate 14 by applying a force at outer deflectable leg 20. By further creating first curved portion 21 substantially across the entire width of bend member 18, the outer deflectable leg 20 extends also for the entire width of bend member 18, thereby providing a continuous surface for engagement at any location by a tool used for removal of the fasteners of the present disclosure at any location along outer deflectable leg 20. The anti-rotational features also provided with fasteners of the present disclosure additionally resist rotation of the fastener components in the fastener installed position, thereby minimizing displacement of the fastener and/or the material of object 52 from the desired installation position of object 52.

The manually installed fasteners 10, 100, 200, 300, 400 commonly include a fastener body 12 having parallel first and second plates 14, 16, the second plate 16 having aperture 26. A bend member 18 integrally joins the first and second plates 14, 16. The bend member 18 has an outer deflectable leg 20 integrally connected to the first plate 14 and an inner deflectable leg 22 integrally connected to the outer deflectable leg 20 and the second plate 16. A first barb 28 is integrally connected to the first plate 14 and extends through the aperture 26 of the second plate 16. A second barb 30 is integrally connected to the second plate 16 and is oppositely oriented or directed with respect to the first barb 28. The second barb 30 and the second plate 16 are elastically displaced with respect to the first barb 28 and the first plate 14 to change the clearance diameter "A" between the first and second barbs 28, 30.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A manually installed fastener, comprising:
    a fastener body having:
        parallel first and second plates, the second plate having an aperture;
        a bend member integrally joining the first and second plates;
        a first barb integrally connected to the first plate and extending through the aperture of the second plate; and
        a second barb integrally connected to the second plate and oppositely oriented with respect to the first barb, the second barb and the second plate being elastically displaced with respect to the first barb and the first plate to change a clearance diameter between the first and second barbs.

2. The manually installed fastener of claim 1, wherein the bend member includes an outer deflectable leg integrally connected to the first plate and an inner deflectable leg integrally connected to the second plate.

3. The manually installed fastener of claim 2, further including a substantially rigid fixed leg extending from the first plate oppositely positioned on the fastener body with respect to the bend member.

4. The manually installed fastener of claim 3, wherein a force applied to the outer deflectable leg elastically deflects at least one of the outer and inner deflectable legs to displace the second plate toward the fixed leg.

5. The manually installed fastener of claim 3, wherein the first barb is displaced away from the second barb by opposed forces applied to each of the outer deflectable leg and the fixed leg.

6. The manually installed fastener of claim 1, further including a substantially rigid fixed leg extending from the first plate oppositely positioned on the fastener body with respect to the bend member, both the fixed leg and the bend member being commonly directed with respect to the first and second barbs.

7. The manually installed fastener of claim 1, wherein the aperture is elongated permitting clearance for displacement of the first barb within the aperture during opposite sliding displacement of the first and second plates.

8. The manually installed fastener of claim 1, further including:
a raised bead created in the second plate; and
a raised bead created in the first plate at least partially received in the raised bead of the second plate thereby preventing rotation between the first and second plates, the raised bead of the first plate slidingly displaced within the raised bead of the second plate during sliding displacement of the first and second plates.

9. The manually installed fastener of claim 1, further including:
a first tab clamp integrally connected to a first edge of the first plate; and
a second tab clamp integrally connected to a second edge of the first plate and oppositely directed with respect to the first tab clamp;
the first and second tab clamps individually bent to create retention portions facing and parallel with the second plate, the retention portions preventing rotation between the first and second plates while allowing sliding displacement of the first and second plates.

10. The manually installed fastener of claim 1, further including:
a first bite member integrally connected to and extending away from the first plate; and
a second bite member integrally connected to and extending away from the first plate and oppositely facing with respect to the first bite member, the first and second bite members engaging a material of a member contacted by the first plate thereby preventing rotation of the fastener.

11. The manually installed fastener of claim 1, wherein each of the first and second barbs includes a curved barb end which together define the clearance diameter between the first and second barbs.

12. A manually installed fastener, comprising:
a fastener body having:
parallel first and second plates, the second plate having an aperture;
a bend member integrally joining the first and second plates, the bend member having an outer deflectable leg integrally connected to the first plate and an inner deflectable leg integrally connected to the second plate;
a first barb integrally connected to the first plate and extending through the aperture of the second plate, the first barb oriented at a first barb orientation angle with respect to the first plate;
a second barb integrally connected to the second plate and oppositely oriented with respect to the first barb, the second barb oriented at a second barb orientation angle with respect to the first plate; and
the aperture being elongated providing clearance for displacement of the first barb within the aperture during opposite sliding displacement of the first and second plates thereby increasing a clearance diameter defined between the first and second barbs.

13. The manually installed fastener of claim 12, wherein the second barb and the second plate are together slidably displaceable with respect to the first barb and the first plate by a force applied to the bend member acting to change the clearance diameter between the first and second barbs.

14. The manually installed fastener of claim 12, wherein each of the first and second barbs includes a curved barb end which together define the clearance diameter between the first and second barbs.

15. The manually installed fastener of claim 12, wherein the first barb orientation angle is equal to the second barb orientation angle.

16. The manually installed fastener of claim 12, wherein the first and second barb orientation angles both range between approximately 20 to 60 degrees.

17. The manually installed fastener of claim 12, further including:
a first tab clamp integrally connected to a first edge of the first plate; and
a second tab clamp integrally connected to a second edge of the first plate and oppositely directed with respect to the first tab clamp;
the first and second tab clamps individually bent to create retention portions facing and parallel with the second plate, the retention portions preventing rotation between the first and second plates while allowing sliding displacement of the first and second plates.

18. A manually installed fastener system, comprising:
a first member having a stud fixedly connected thereto;
a second member contacting the first member and having an aperture through which the stud extends;
a fastener body having:
parallel first and second plates, the second plate having an aperture;
a bend member integrally joining the first and second plates;
a first barb integrally connected to the first plate and extending through the aperture of the second plate; and
a second barb integrally connected to the second plate and oppositely oriented with respect to the first barb, the second barb and the second plate being slidably displaced away from the first barb and the first plate to increase a clearance diameter between the first and second barbs when the stud is received between the first and second barbs, a biasing force created by the displacement of the first and second barbs acting to releasably engage the first and second barbs to the stud.

19. The manually installed fastener system of claim 18, wherein the bend member includes an outer deflectable leg integrally connected to the first plate and an inner deflectable leg integrally connected to the second plate, the inner and outer deflectable legs deflected by a force applied to the bend member.

20. The manually installed fastener system of claim 19, further including a substantially rigid fixed leg extending from the first plate oppositely positioned on the fastener body with respect to the bend member, wherein an opposite force applied to the fixed leg with respect to the force applied to the bend member acts to increase the clearance diameter.

21. The manually installed fastener system of claim 20, wherein a force applied to the outer deflectable leg elastically deflects at least one of the outer and inner deflectable legs to displace the second plate toward the fixed leg acting to increase the clearance diameter.

22. The manually installed fastener system of claim 20, wherein the first barb is displaced away from the second barb by opposed forces applied to each of the outer deflectable leg and the fixed leg acting to increase the clearance diameter and permitting release of the fastener from the stud.

23. The manually installed fastener system of claim 18, further including a substantially rigid fixed leg extending from the first plate oppositely positioned on the fastener body with respect to the bend member, both the fixed leg and the bend member being commonly directed with respect to the first and second barbs.

24. The manually installed fastener system of claim 18, wherein the aperture is elongated permitting clearance for displacement of the first barb within the aperture during opposite sliding displacement of the first and second plates.

25. The manually installed fastener system of claim 18, further including:
   a first tab clamp integrally connected to a first edge of the first plate; and
   a second tab clamp integrally connected to a second edge of the first plate and oppositely directed with respect to the first tab clamp;
   the first and second tab clamps individually bent to create retention portions facing and parallel with the second plate, the retention portions preventing rotation between the first and second plates while allowing sliding displacement of the first and second plates.

26. A manually installed fastener, comprising:
   a fastener body having:
      parallel first and second plates, the second plate having an aperture;
      a bend member integrally joining the first and second plates;
      a first barb integrally connected to the first plate and extending through the aperture of the second plate;
      a second barb integrally connected to the second plate and oppositely oriented with respect to the first barb;
      a first tab clamp integrally connected to a first edge of the first plate; and
      a second tab clamp integrally connected to a second edge of the first plate and oppositely directed with respect to the first tab clamp, the first and second tab clamps individually bent to create retention portions facing and parallel with the second plate, the retention portions preventing rotation between the first and second plates while allowing sliding displacement of the first and second plates.

27. The manually installed fastener of claim 26, wherein during sliding displacement of the first and second plates the second barb and the second plate are elastically displaced with respect to the first barb and the first plate thereby changing a clearance diameter between the first and second barbs.

28. The manually installed fastener of claim 26, wherein the first and second tab clamps define mirror images of each other.

29. The manually installed fastener of claim 26, wherein each of the first and second tab clamps includes a connecting portion which is integrally connected to an edge of the first plate, the connecting portion transitioning into a bend portion which further transitions into a retention portion having a contact face positioned parallel to an upper surface of the second plate.

* * * * *